United States Patent
Lyon (10) Patent No.: US 12,510,684 B2
(45) Date of Patent: Dec. 30, 2025

(54) METAL DETECTION APPARATUS

(71) Applicant: Mettler-Toledo Safeline Ltd., Manchester (GB)

(72) Inventor: David Lyon, Cheadle Hulme (GB)

(73) Assignee: Mettler-Toledo Safeline Ltd., Manchester (GB)

(*) Notice: Subject to any disclaimer, the term of this patent is extended or adjusted under 35 U.S.C. 154(b) by 271 days.

(21) Appl. No.: 18/273,403

(22) PCT Filed: Jan. 17, 2022

(86) PCT No.: PCT/EP2022/050881
§ 371 (c)(1),
(2) Date: Jul. 20, 2023

(87) PCT Pub. No.: WO2022/157117
PCT Pub. Date: Jul. 28, 2022

(65) Prior Publication Data
US 2024/0094428 A1 Mar. 21, 2024

(30) Foreign Application Priority Data
Jan. 21, 2021 (EP) .................................. 21152657

(51) Int. Cl.
*G01V 3/10* (2006.01)
(52) U.S. Cl.
CPC .................................. *G01V 3/105* (2013.01)
(58) Field of Classification Search
None
See application file for complete search history.

(56) References Cited

U.S. PATENT DOCUMENTS

| 5,521,583 | A  | * | 5/1996 | Frahm ............... G01V 3/105 324/243 |
| 7,663,361 | B2 |   | 2/2010 | Nishio et al. |
| 8,013,610 | B1 | * | 9/2011 | Merewether ......... G01V 3/165 324/228 |

(Continued)

FOREIGN PATENT DOCUMENTS

| JP | 2007-278719 A | 10/2007 |
| JP | 2013-12981 A | 1/2013 |

*Primary Examiner* — Nasima Monsur
(74) *Attorney, Agent, or Firm* — Standley Law Group LLP; Jeffrey S. Standley; Adam J. Smith (57) ABSTRACT

A metal detection apparatus includes a balanced coil system with a transmitter coil connected to a transmitter unit, and receiver coils connected to a receiver unit, connected to a signal processing unit. A controllable frequency generator provides a selectable operating frequency to an amplifier stage, connected to an adaptation unit, which includes a coupling transformer with at least one primary and secondary coil having a terminal and tappings. The adaption unit includes tuning capacitors having terminals and switching devices, with which the secondary coil and at least one of the tuning capacitors is connectable. Individually selectable resonator channels, when selected, each include the transmitter coil, tapped windings of the secondary coil of the coupling transformer, and one of the tuning capacitors connected by a first and second semiconductor switching device, controllable by a channel selector such that one of the resonator channels is always selectable.

17 Claims, 2 Drawing Sheets

(56) References Cited

U.S. PATENT DOCUMENTS

| | | | |
|---|---|---|---|
| 8,587,301 B2 | 11/2013 | Derungs | |
| 8,841,903 B2 | 9/2014 | Lyon | |
| 10,184,908 B2 | 1/2019 | Lyon | |
| 10,215,875 B2 | 2/2019 | Moore et al. | |
| 2004/0000919 A1* | 1/2004 | Gupta | G01V 3/10 324/693 |
| 2004/0260174 A1* | 12/2004 | Keene | G01V 3/107 128/899 |
| 2015/0234075 A1* | 8/2015 | Moore | G01V 3/10 324/225 |
| 2017/0176364 A1* | 6/2017 | Lyon | H03F 3/245 |

* cited by examiner

METAL DETECTION APPARATUS

TECHNICAL FIELD

The current invention relates to a metal detection apparatus that uses a plurality of operating frequencies.

BACKGROUND ART

An industrial metal detection apparatus as described for example in U.S. Pat. No. 8,587,301 B2, is used for detecting metal contamination in a product. When properly installed and operated, it will help reducing metal contamination and improving food safety. Most modern metal detectors utilise a search head comprising a "balanced coil system". Detectors of this design are capable of detecting all metal contaminant types including ferrous, nonferrous and stainless steels in a large variety of products such as fresh and frozen products.

A metal detection apparatus that operates according to the "balanced coil"-principle comprises three coils, a transmitter coil and two identical receiver coils that are wound onto a non-metallic frame, each typically parallel with the other. Since the receiver coils, which typically enclose the transmitter coil centred in between, are identical, an identical voltage is induced in each of them. In order to receive an output signal that is zero when the system is in balance, the first receiver coil is connected in series with the second receiver coil having an inversed sense of winding. Hence, the voltages induced in the receiver coils, which are of identical amplitude and inverse polarity, are cancelling out one another in the event that the system is in balance and no contaminant is present in an observed product.

However, as soon as a particle of metal passes through the coil arrangement and is exposed to the magnetic field, Eddy currents are forced to flow in the metal particle. Eddy currents produce a secondary magnetic field, which disturbs the primary electromagnetic field first near one receiver coil and then near the other receiver coil. While the particle of metal is conveyed through the receiver coils, the voltage induced in each receiver coil is changed (by nano-volts). This change in balance results in a signal at the output of the detection coils that in a receiver unit can be processed, amplified, possibly filtered and subsequently used to detect the presence of metal contaminant in observed products that are traversing the metal detection apparatus on a conveyor system.

In the receiver unit the input signal is normally split into an in-phase component and a quadrature component. The vector composed of these components has a magnitude and a phase angle, which is typical for the products and the contaminants that are conveyed through the coil system. In order to identify a metal contaminant, "product effects" need to be removed or reduced. If the phase of the product is known then the corresponding signal vector can be reduced so that a higher sensitivity results for the detection of signals originating from metal contaminants.

Methods applied for eliminating unwanted signals from the signal spectrum exploit the fact that metal contaminants, products and other disturbances have different influences on the magnetic field so that the detected signals differ in phase. Materials with a high conductivity cause signals with a higher negative reactive signal component and a smaller resistive signal component. Materials with a high magnetic permeability cause signals with a smaller resistive signal component and a higher positive reactive signal component. Signals caused by ferrite are primarily reactive, while signals caused by stainless steel are primarily resistive. Products, which are conductive, typically cause signals with a strong resistive component. The phase angle of the signal vectors between the resistive signal component and reactive signal component remains normally constant, when a product or contaminant is conveyed through the metal detection apparatus.

Distinguishing between the phases of the signal components of different origin by means of a phase detector allows obtaining information about the product and the contaminants. A phase detector, e.g. a frequency mixer or analogue multiplier circuit, generates a voltage signal which represents the difference in phase between the signal input, such as the output signal of the receiver coils, and a reference signal provided by the transmitter unit to the receiver unit. Hence, by selecting the phase of the reference signal to coincide with the phase of the product signal component, a phase difference and a corresponding product signal is obtained at the output of the phase detector that is zero. In the event that the phase of the signal that originates from a contaminant differs from the phase of the product signal, then the product signal can be suppressed while the signal of the contaminant can be further processed. However in the event that the phase of the signal of the contaminant is close to the phase of the product signal, then the detection of contaminant fails, since the signal of the contaminant is suppressed together with the product signal. In order to separate the phase angle of a product signal from the phase angle of a contaminant, a suitable operating frequency is determined and applied.

U.S. Pat. No. 8,841,903B2 discloses a metal detection apparatus, which comprises a transmitter unit that provides transmitter signals to a transmitter coil that is inductively coupled to a first and a second receiver coil, which are connected to a receiver unit connected to a signal processor. The transmitter unit comprises a frequency generator that provides an operating frequency to the input of an amplifier stage, whose output is connected via a coupling transformer to the transmitter coil. The output of the amplifier stage is connected via a first switch bank to a first tapping and the transmitter coil is connected via a second switch bank to a second tapping of the same transformer winding of the transformer. With this arrangement a resonant circuit, which consists of the transmitter coil and the selectable capacitors, can be tuned independently of other parts of the transmitter unit to a selected operating frequency. The amplifier stage comprises a class A circuit that amplifies signals with minimum distortion, but with low efficiency since the power transistor consumes current continuously even in the quiescent state.

U.S. Ser. No. 10/184,908B2 discloses a metal detection apparatus with a coupling transformer that comprises a primary coil with a first winding and a second winding, which are connected to the output of the amplifier stage, and a secondary coil that is connected to the transmitter coil. The first and second windings are connected with a first end to a supply voltage and have each at least one tapping at a same turn number counted from said first end. The amplifier stage comprises a first amplification wing with at least a first power transistor connected to the at least one tapping of the first winding and a second amplification wing with at least a second power transistor connected to the at least one tapping of the second winding. The first amplification wing amplifies the first half wave and the second amplification wing amplifies the second half wave of an input signal. The secondary coil of the coupling transformer comprises a plurality of tappings. A first end of the transmitter coil is connected to one of these tappings and the second end of the transmitter coil is selectively connectable via a switch to another one of the tappings. With this arrangement the transmitter coil can be adapted in a wider range to the amplifier stage. Connected with tuning capacitors the transmitter coil forms a resonant circuit that can be tuned. The first end of the transmitter coil is selectively connectable via a switch to one side of one of the tuning capacitors and the second end of the transmitter coil is connected directly or via a plurality of turns of the secondary winding to the other side of the tuning capacitors. Connection of the transmitter coil to the tappings of the secondary coil and to the tuning capacitors is established by means of suitable power relays, selectable for example from Power Relays, Catalogue 2020, Panasonic Industry.

A problem of such a metal detection apparatus is that changing the system from a first tuned state to a second tuned state requires considerable time so that changing the operating frequency forth and back and maintaining optimal tuning while detecting contaminants in a conveyed product is scarcely possible.

US20150234075A1 discloses a method for compensating imbalances in the coil system and for suppressing the influence of vibrations and noise. The metal detection apparatus is calibrated to suppress signals caused by ferrite, which resemble the signals originating from noise. Consequently, by eliminating signals originating from ferrite, signals caused by vibration and noise are automatically suppressed as well. According to this method the output signal of the metal detection apparatus is measured in the presence of ferrite within the coil system and digitally adjusted so that the resistive signal component of the ferrite is eliminated. While the described method for compensating imbalances and for suppressing vibrations and noise is highly efficient, random disturbances caused by the transmitter unit itself may still cause problems.

The present invention is therefore based on the object of providing an improved metal detection apparatus that is tuneable to a plurality of operating frequencies.

The metal detection apparatus shall be tuneable to different operating frequencies in the shortest possible time.

Furthermore, the metal detection apparatus shall be redesigned in such a way that random disturbances caused by the transmitter unit, which are difficult to handle by the electronic compensation system, shall be reduced or avoided. Still further, thermal losses that may cause imbalances shall be reduced.

SUMMARY OF INVENTION

In a first broad aspect of the invention there is provided a metal detection apparatus comprising a balanced coil system with a transmitter coil connected with a first coil terminal and a second coil terminal to a transmitter unit and with a first and a second receiver coil connected to an input of a receiver unit, whose output is connected to a signal processing unit, which transmitter unit comprises a controllable frequency generator that provides an input signal with a selectable operating frequency to the input of an amplifier stage, the output of the amplifier stage being connected to an adaptation unit, which comprises a coupling transformer with at least one primary coil and at least one secondary coil having a transformer coil terminal and a plurality of transformer tappings and which comprises a plurality of tuning capacitors having first and second capacitor terminals and which comprises switching devices, with which the secondary coil of the coupling transformer and at least one of the tuning capacitors is connectable to the transmitter coil.

According to the invention a plurality, preferably two, three or more, of individually selectable resonator channels is provided, each resonator channel, when selected, comprising the transmitter coil, tapped windings of the secondary coil of the coupling transformer, one of the tuning capacitors connected to one another by a first semiconductor switching device and by a second semiconductor switching device, which are controllable by a channel selector such that always one of the resonator channels is selectable.

The individually selectable resonator channels are arranged in parallel such that they do not interact with one another. Hence a selected resonator channel is not interfered by in the circuitry of the other selectable resonator channels. Hence, precise tuning of the selected resonator channel is not impaired by the remaining circuitry.

In preferred embodiments for each resonator channel, when selected, the related tapped windings of the secondary coil of the coupling transformer are connected by the related first semiconductor switching device in series or in parallel to the transmitter coil. The transmitter coil is connected with one of its coil terminals, switchable or firmly, with the transformer coil terminal. Generally, the transformer windings between the transformer coil terminal and a selected transformer tapping are defined as "the tapped windings". Preferably, for each resonator channel, when selected, the related tuning capacitor is connected by the related second semiconductor switching device in series or in parallel to the transmitter coil. With the connection of the tapped windings and the tuning capacitors in series or in parallel, resonator channels with different properties can be created.

Most preferably, for each resonator channel, when selected, the related tapped windings of the secondary coil of the coupling transformer and the related tuning capacitor are connected by the related first and second semiconductor switching devices each in parallel to the transmitter coil.

Semiconductor switching devices allow switching within nanoseconds, so that the inventive metal detection apparatus can not only switch operating frequencies but can maintain optimal tuning for each selected operating frequency when switched forth and back in short intervals. Hence, the inventive metal detection apparatus can be equipped with an operating program that allows switching and tuning within short time intervals practically without interruption of the measurement process. Hence, the operating program may be designed such that changes of the operating frequency are performed while measurement of an object in order to detect contaminants is in progress. Changing the operating frequency allows detecting signals from various sorts of contaminants and products. Maintaining optimal tuning allows measuring signals with highest signal-to-noise ratio.

Semiconductor switching devices, which preferably comprise at least one MOS-FET allow switching between intervals of approximately 20 ns and have a small channel resistance of typically below 0.010 Ohm. Hence, warming of contacts and corresponding losses with undesired impact on the circuitry as experienced with power relays are avoided. Further, suitable semiconductor switching devices are capable to block voltages of up to 150V and to support currents of up to 10 A or more.

However, power relays are considered more robust against high voltage oscillations, wherefore such power relays where integrated into the transmitter circuit. The inventive transmitter is therefore designed accordingly. In preferred embodiments, the channel selector comprises for each one of the first semiconductor switching devices and the second semiconductor switching devices at least one isolated driver, such as a photovoltaic driver, whose input lines and output lines are galvanically separated from one another. Hence, the control circuitry is isolated from the power stage.

Preferably, the first semiconductor switching devices and the second semiconductor switching devices are bi-directional-MOS-FET units. Each bi-directional-MOS-FET unit preferably comprises a first MOS-FET and a second MOS-FET, each having a source terminal, a drain terminal and a gate terminal. The two matched MOS-FETs are preferably provided with the source terminals connected on the one hand with one another and on the other hand with identical first terminals of two diodes, which are connected each with their second terminal to the drain terminal of the first MOS-FET or the second MOS-FET, respectively.

The two MOS-FETs, which are connected in series and are pointing in opposite directions, have four possible states ON-ON, ON-OFF, OFF-ON, and OFF-OFF. For activating a resonator channel the two MOS-FETs of the related first and second semiconductor switching devices are both switched on and for deactivating the resonator channel the two MOS-FETs of the related first and second semiconductor switching devices are both switched off. When switched on, current can flow in both directions through the circuit. In one direction the current flows through the first MOS-FET and the related first diode and in the other direction through the second MOS-FET and the related second diode. When switched off current cannot flow in either direction, because with both FETs off the two diodes are blocking current flow in either direction.

The input lines of the isolated drivers assigned to the first semiconductor switching device and to the second semiconductor switching device of the related selectable resonator channel, respectively, which are connected each to a light emitting diode, are preferably connected in series. The output lines of the isolated drivers are connected to the input terminals of the first semiconductor switching device and the second semiconductor switching device of the related selectable resonator channel, respectively. The control voltage is applied to the interconnected gate terminals and typically the source terminals of the MOS-FETs. Hence, the isolated drivers and the connected first and second semiconductor switching devices together with the integrated MOS-FETs are always switched simultaneously without delays or time shifts.

In a particularly preferred embodiment, the light emitting diodes of the isolated drivers are connected each or together in series with a control resistor. Hence, the light emitting diode or the light emitting diodes connected in series with the control resistor form a control loop that is connected to the output of a constant voltage supply device, preferably a low dropout regulator. This circuitry has further advantages, and allows temperature stabilization of the MOS-FETs. The voltage across the light emitting diodes of the isolated drivers and the control resistor is fixed. With increasing temperature the voltage across the light emitting diodes drops and the voltage across the control resistor and the current through the control resistor increase proportionally. The higher current causes the light emitting diodes to emit more light towards the light sensitive diode(s) provided in the isolated drivers. Consequently, the control voltage applied to the MOS-FETs increases causing the channel resistance of the MOS-FETs, which has risen with temperature, to decrease again. The channel resistance of the MOS-FETs is therefore kept constant while the temperature is changing.

BRIEF DESCRIPTION OF DRAWINGS

Detailed aspects and examples of the invention are described below with reference to the drawings, wherein.

DESCRIPTION OF EMBODIMENTS

Figure 1:
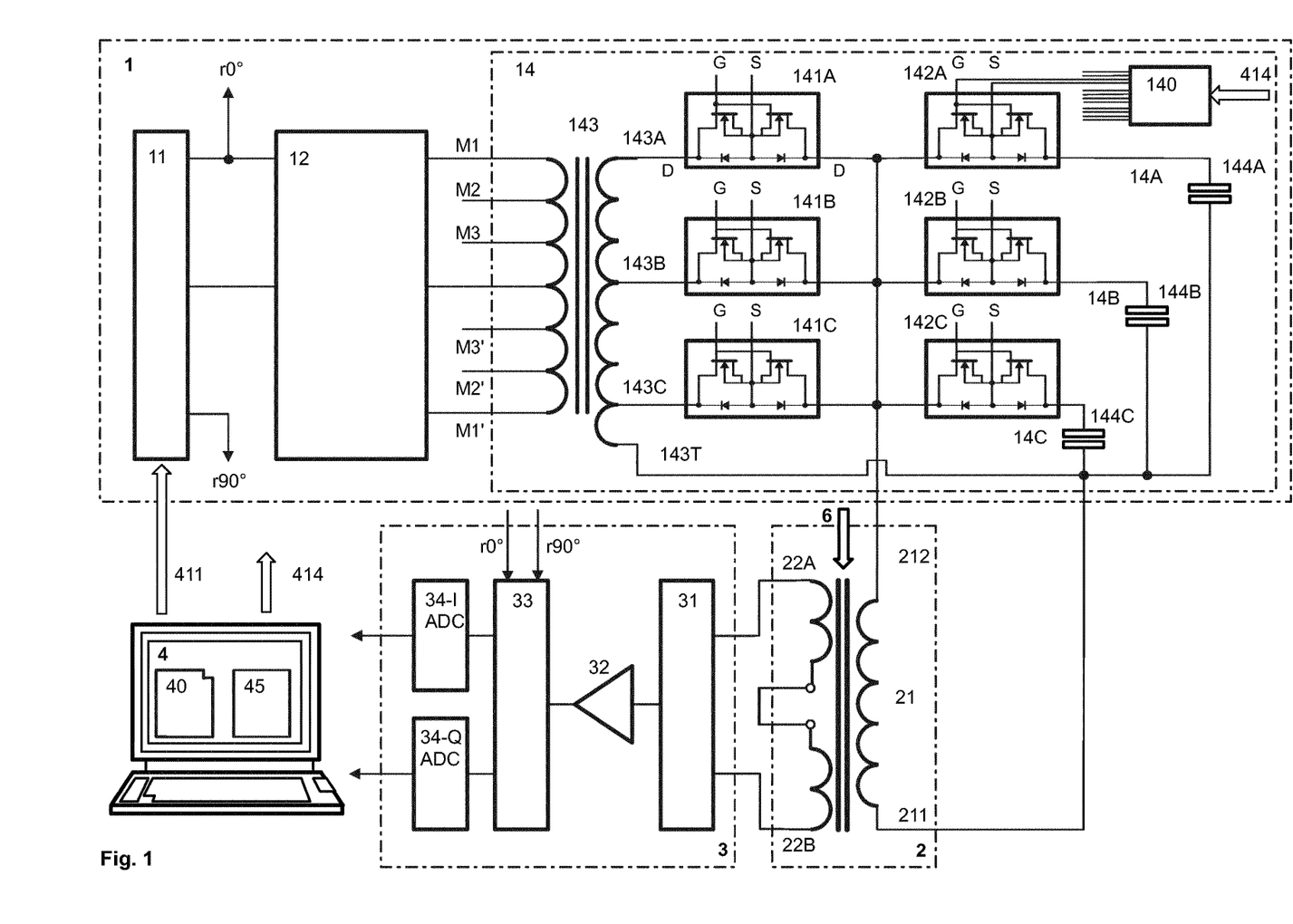
FIG. 1 shows a preferred embodiment of an inventive metal detection apparatus comprising a transmitter unit 1, a coil system 2, a receiver unit 3 and a control unit 4 with an operating program 40 and a signal processing unit 45 and further with an adaptation module 14 provided in the transmitter unit 1, which comprises a plurality of selectable resonator channels 14A; 14B; 14C, which are tuned to the selected operating frequency.

FIG. 1 shows a preferred embodiment of an inventive metal detection apparatus, which comprises a transmitter unit 1, a balanced coil system 2 with a transmitter coil 21 and a first and a second receiver coil 22A, 22B, a receiver unit 3 and a control unit 4, which comprises an operating program 40 implemented in a computing device, a signal processing device 45 such as a digital signal processor and input and output devices, with which the metal detection apparatus and the implemented measurement and calibration processes are monitored and controlled, i.a. by control signals 411, 414. Symbolically shown is a conveyor 6, on which products are transferable through the balanced coil system 2.

The transmitter unit 1 comprises a controllable frequency generator 11 that provides an input signal r0° with a selectable operating frequency to the input of an amplifier stage 12, whose output is connected to an adaptation unit 14. The adaptation unit 14 comprises a plurality of tuning capacitors 144A, 144B, 144C and a coupling transformer 143 with at least one primary coil and at least one secondary coil having a transformer coil terminal 143T and a plurality of transformer tappings 143A, 143B, 143C. The output lines of the amplifier stage 12 are connected symmetrically to suitable tappings M1, M1'; M2, M2'; M3, M3' of the primary coil of the coupling transformer 143. The configuration of the amplifier stage 12 may be designed to operate in any suitable mode such as in class A or class B mode. In the present configuration the amplifier operates in class B mode applying one half wave to tapping M1 and the other half wave to the corresponding taping M1'.

The coil terminal 143T is connected to the first terminal 211 of the transmitter coil 21 and the second terminal 212 of the transmitter coil 21 is connectable to one of the transformer tappings 143A, 143B, 143C. The windings of the secondary coil of the coupling transformer 143 between the transformer coil terminal 143T and the isolated transformer tapping 143A, 143B, 143C are defined as the "tapped windings".

During operation of the metal detection apparatus a transmitter signal is applied to the transmitter coil 21 of the balanced coil system 2. Further, the transmitter unit 1 provides an in-phase reference signal r0° and a quadrature reference signal r90° to the receiver unit 3. The transmitter signal induces signals in the identical receiver coils 22A, 22B which signals are of inverse polarity and of the same magnitude as long as the system is in balance, i.e. as long as no product, particularly no product contaminated with metal is traversing the coil system 2. In the event that a product, particularly a product contaminated with an electro-conductive object is traversing the coil system 2, then the magnitudes of the signals induced in the identical receiver coils 22A, 22B will change and the inversely polarized signals will no longer compensate one another. As a result the transmitter signal induced in the receiver coils 22A, 22B gets modulated with a baseband signal, whose amplitude and frequency depend on the property, dimension and travelling speed of the electro-conductive object.

The output signals of the receiver coils are applied to a matching unit 31, for example comprising a balanced transformer with center-tapped primary windings that mirror the receiver coils and two identical center-tapped secondary windings whose opposite tails are connected to an amplifier 32. The output of the amplifier 32 is connected to a demodulation unit 33, which provides at its outputs the in-phase and quadrature components of the demodulated receiver signal, i.e. the in-phase and quadrature components of the baseband signal, which originates from conveyed products. The in-phase and quadrature components of the baseband signal provided at the outputs of the demodulation unit 33 are converted in analogue to digital converter 34-I and 34-Q from analogue form to digital form. The output signals of the analogue to digital converters 34-I and 34-Q are forwarded to a signal processing unit 45, such as a known digital signal processor, provided in the control unit 4. The signal processing unit 45 suppresses signal components originating from the product and processes signal components originating from contaminants. The receiver unit may further comprise filters unit and gain adjustment units.

The measurement process is controlled by an operating program provided in the control unit 4. With control signals 411 operating frequencies are selected according to the planned measurement process. With control signals 414 the adaptation unit is configured according to the selected operating frequencies.

The adaptation unit 14 is provided with first semiconductor switching devices 141A, 141B, 141C and second semiconductor switching devices 142A, 142B, 142C, which are controllable by a channel selector 140 such that always one of a plurality of resonator channels 14A; 14B; 14C is selectable. The channel selector 140, which receives commands 414 from the control unit 4, is designed such that the first semiconductor switching devices 141A, 141B, 141C and the second semiconductor switching devices 142A, 142B, 142C of only one of the resonator channels 14A; 14B; 14C are activated. For example, the uppermost resonator channel 14A is activated by actuating the first semiconductor switching device 141A and the second semiconductor switching devices 142A, while the remaining first semiconductor switching devices 141B, 141C and the second semiconductor switching devices 142B, 142C are switched off. If the first semiconductor switching device 141B and the second semiconductor switching device 142B of the second resonator channel 14B are activated, then the first semiconductor switching devices 141A, 141C and the second semiconductor switching devices 142A, 142C are switched off. If the first semiconductor switching device 141C and the second semiconductor switching device 142C of the third resonator channel 14C are activated, then the first semiconductor switching devices 141A, 141B and the second semiconductor switching devices 142A, 142B are switched off. Hence, the metal detection apparatus in the shown embodiment comprises three resonator channels 14A; 14B; 14C, which comprise each a pair of first and second semiconductor switching devices 141A, 142A; 141B, 142B; 141C, 142C. In other embodiments, the metal detection apparatus may comprise instead of three resonator channels 14A, 14B, 14C, two, four or more resonator channels 14A, 14B, 14C, . . . .

Each one of the resonator channels 14A, 14B, 14C, when selected, comprises the transmitter coil 21, one of the tuning capacitors 144A, 144B, 144C and the tapped windings of the secondary coil of the coupling transformer 143. In the present embodiment, the related tuning capacitor 144A; 144B or 144C and the tapped windings of the secondary coil of the coupling transformer 143 are connected in parallel to the transmitter coil 21, when the related pair of first and second semiconductor switching devices 141A, 142A; 141B, 142B; 141C, 142C is activated.

The first coil terminal 211 of the transmitter coil 21 is fixedly connected to the coil terminal 143T of the secondary winding of the coupling transformer 143 and to a first terminal of the tuning capacitors 144A, 144B, 144C. The second coil terminal 212 of the transmitter coil 21 is fixedly connected to a common first terminal of each pair of the first and second semiconductor switching devices 141A, 142A; 141B, 142B; 141C, 142C. By the first semiconductor switching devices 141A, 141B, 141C the second terminal 212 of the transmitter coil 21 is connectable to one of the transformer tappings 143A, 143B, 143C. The tapped windings of the secondary coil of the coupling transformer 143 between the selected tapping 143A, 143B, 143C and the coil terminal 143T are therefore connectable in parallel to the transmitter coil 21. By the second semiconductor switching devices 142A, 142B, 142C the second terminal 212 of the transmitter coil 21 is connectable to the second terminal of the tuning capacitors 144A, 144B, 144C. The tuning capacitors 144A, 144B, 144C are therefore connectable in parallel to the transmitter coil 21. However, the channel selector 140 is preferably designed such, that only one pair of the first and second semiconductor switching devices 141A, 142A; 141B, 142B; 141C, 142C is activated at a time. With the control signals 414 applied from the control unit 4 to the of the channel selector 140 one of the resonator channels 14A, 14B, 14C is selectable in order to tune the balanced coil system 2 to the operating frequency selected by the control unit 4

Hence, with each change of the operating frequency selected with control signals 411 the related resonator channels 14A, 14B or 14C is preferably automatically selected as well. Hence, not only changing of the operating frequency, but also tuning of the balanced coil system 2 can be performed within the shortest possible time depending on the switching speed of the first and second semiconductor switching devices 141A, 142A; 141B, 142B; 141C, 142C, which typically lies within a fraction of a microsecond. It is therefore possible to change the operating frequency and the tuning of the balanced coil system forth and back in short intervals during the measurement process.

The resonator channels 14A, 14B, 14C are individually selected and deselected, so that the selected resonator channel 14A, 14B or 14C is not impaired by elements of the deselected resonator channel 14A, 14B or 14C. The resonator channels 14A, 14B, 14C are practically arranged in parallel and have only the transmitter coil 21 and a part of that secondary coil of the coupling transformer 143 in common. With this design it is possible to reliably suppress interferences of the elements of the deactivated resonator channels 14A, 14B; 14A, 14C; 14B, 14C with the activated resonator channel 14A or 14B or 14C.

The first and second semiconductor switching devices 141A, 142A; 141B, 142B; 141C, 142C are preferably MOS- FET circuits, which together with the channel selector 40 are described below with reference to FIG. 2 in further detail.

Figure 2:
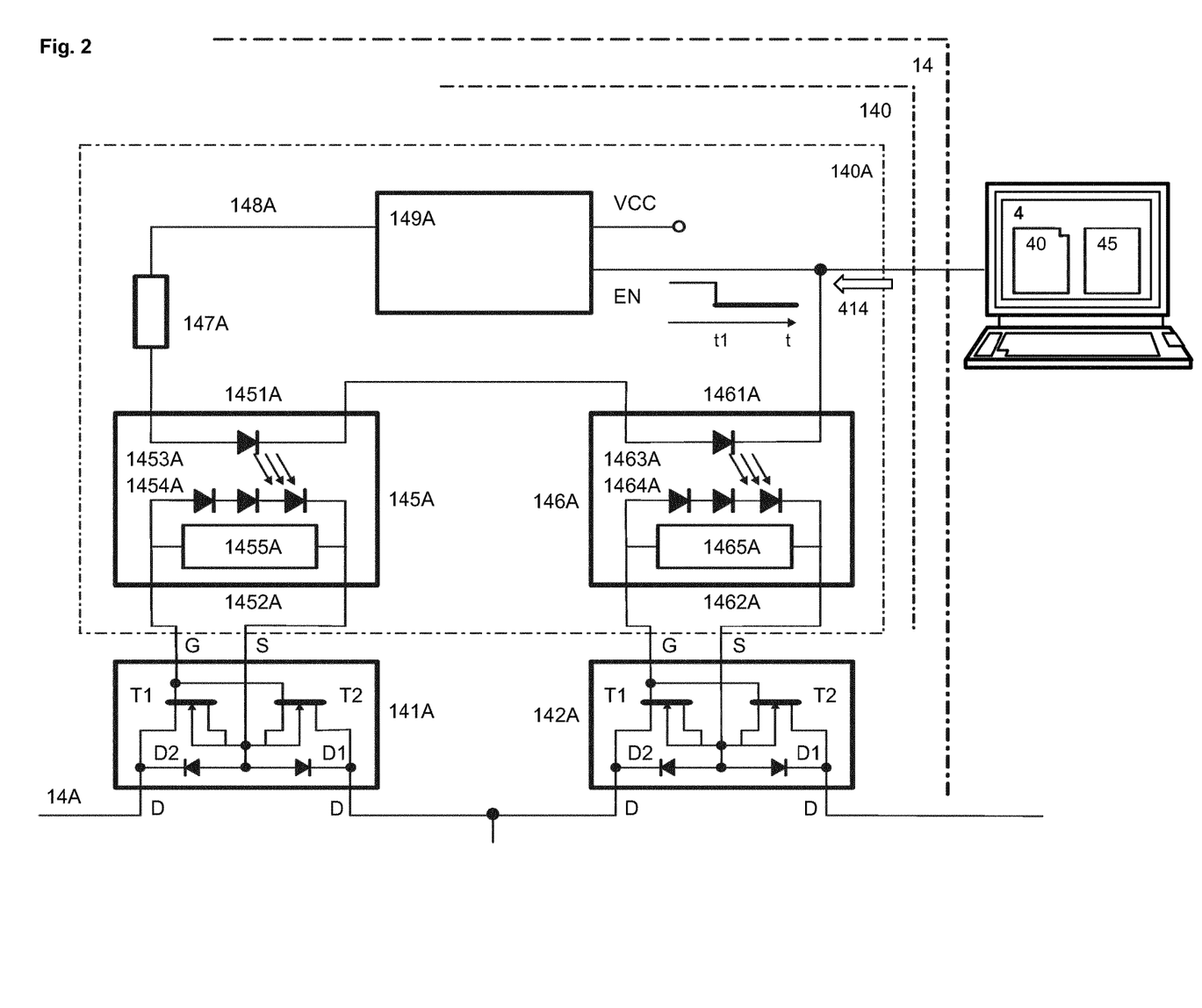
FIG. 2 shows a part of the adaptation unit 14 and a channel selector 140 comprising control circuitry for controlling a first semiconductor switching device 141A and a second semiconductor switching device 142A, with which a first resonator channel 14A is selectable.

FIG. 2 shows a section of the channel selector 140 provided within the adaptation module 14 as well as the pair of first and second semiconductor switching devices 141A, 142A of the first resonator channel 14A. The first and second semiconductor switching devices 141A, 142A are preferably provided in the embodiment of bi-directional-MOS-FET units. Each bi-directional-MOS-FET unit 141A, 142A; 141B, 142B; 141C, 142C comprises a first MOS-FET T1 and a second MOS-FET T2, each having a source terminal S, a drain terminal D and a gate terminal G. The source terminals S of the MOS-FETs T1 and T2 are connected on the one hand with one another and on the other hand with identical first terminals, i.e. the anodes, of two diodes D1, D2, which are connected each with their second terminal, i.e. the cathode, to the drain terminal D of the first MOS-FET T1 or the second MOS-FET T2, respectively. The two MOS-FETs T1 and T2, which are connected in series and are pointing in opposite directions, have four possible states ON-ON, ON-OFF, OFF-ON, and OFF-OFF, but are switched ON and OFF always pairwise. For activating the first resonator channel 14A the MOS-FETs T1 and T2 of the related first and second semiconductor switching devices 141A, 142A; 141B, 142B; 141C, 142C are both switched on and for deactivating the first resonator channel 14A the related two MOS-FETs T1 and T2 of the related first and second semiconductor switching devices 141A, 142A; 141B, 142B; 141C, 142C are both switched off. When switched on, current can flow in both directions through the MOS-FET circuits. In one direction the current flows e.g. through the first MOS-FET T1 and through the related first diode D1 and in the other direction through the second MOS-FET T2 and the related second diode D2. When switched off, current cannot flow in either direction, because with both MOS-FETs T1 and T2 off the two diodes D1 and D2, which are facing with their cathodes in opposite directions, are blocking current flow in either direction. The two MOS-FETs T1 and T2 and the two diodes D1 and D2 are matched with one another, so that the required current, which is typically in the range or higher than 10 A, can flow in both directions.

The channel selector 140 comprises for each one of the selectable resonator channels 14A, 14B, 14C identical channel selector modules. The shown channel selector module 140A comprises for the first and the second semiconductor switching device 141A, 142A an isolated driver 145A, 146A, with which control lines of the channel selector 140 are galvanically isolated from control inputs of the semiconductor switching devices 141A, 142A. The isolated drivers 145A, 146A are preferably optically isolated MOS-FET drivers comprising a light emitting diode 1453A, 1463A and light sensitive diodes 1454A, 1464A and preferably an internal or external turn off circuit 1455A, 1465A used for increasing the overall switching speed by decreasing the turn-off time. The required current to drive its internal circuitry is preferably derived from the LED current on the low voltage primary side of the isolation barrier or the input lines 1451A, 1461A of the isolated drivers 145A, 146A. The output lines 1452A, 1462A provided on the secondary side of the isolation barrier of the isolated drivers 145A, 146A are connected to the input terminals G, S of the related semiconductor switching device 141A; 142A.

The first input terminal G is connected to the gate terminals of the two MOS-FETs T1 and T2. The second input terminal S is connected to the source terminals of the two MOS-FETs T1 and T2. Both MOS-FETs T1 and T2 of each semiconductor switching device 141A; 142A are therefore simultaneously switched on and off.

The light emitting diode 1453A, 1463A of the isolated drivers 145A, 146A assigned to the first semiconductor switching device 141A and the second semiconductor switching device 142A are connected in series so that they always carry the same current and are always simultaneously switched on and off.

The light emitting diodes 1453A, 1463A of the isolated drivers 145A, 146A are further connected in series with a control resistor 147A thus forming a control loop 148A that is connected to the output of a constant voltage supply device 149A. This circuitry allows temperature stabilization of the MOS-FETs T1 and T2 of the semiconductor switching devices 141A; 142A. The voltage across the light emitting diodes 1453A, 1463A of the isolated drivers 145A, 146A and the control resistor 147A is fixed by the constant voltage supply device 149A. With increasing temperature the voltage across the light emitting diodes drops 1453A, 1463A and the voltage across the control resistor 147A and the current through the control resistor 147A increase accordingly. The higher current causes the light emitting diodes 1453A, 1463A to emit more light to towards the light sensitive diodes 1455A, 1465A provided in the isolated drivers 145A, 146A. Consequently, the control voltage applied to the MOS-FETs T1 and T2 of the semiconductor switching devices 141A; 142A increases accordingly, causing the channel resistance of the MOS-FETs T1 and T2, which has risen with temperature, to decrease again. The channel resistance of the MOS-FETs T1 and T2 is therefore kept constant while the temperature is changing. Changes of temperature has therefore no effect on currents flowing in and activated resonator channel 14A, 14B, 14C. Due to the extremely low channel resistance of the MOS-FETs T1 and T2, when switched on, temperature losses and an adverse impact of this circuitry of the metal detection apparatus are small, thus reducing the requirement of correction.

The constant voltage supply device 149A has an input for a supply voltage VCC and a control input EN to which the control signal 414 is applied, which changes for example between the potential of the supply voltage VCC and ground potential. When ground potential is applied, current can flow through the control loop 148A to ground or ground potential applied to the control input EN. The voltage applied by the constant voltage supply device 149A to the control loop 148 is kept constant.

The constant voltage supply device 149A is preferably a low dropout regulator which can regulate the output voltage supplied to the control loop 148A even when the supply voltage VCC is very close to this output voltage. In FIG. 2 a small diagram shows that at time t1 the control input EN had been set to ground potential so that current flows through the control loop 148A, i.e. the control resistor 147A and the light emitting diodes 1453A, 1463A. Hence, both semiconductor switching devices 141A; 142A and therefore the first resonator channel 14A were activated exactly at time t1.

REFERENCE SIGNS LIST 1 transmitter unit
11 controllable frequency generator
12 amplifier stage
14 adaptation unit
14A, 14B, 14C selectable resonator channels
140 channel selector
140A channel selector module for resonator channel 14A 141A, 141B, 141C first semiconductor switching devices
142A, 142B, 142C second semiconductor switching devices
143 coupling transformer
143A, 143B, 143C transformer tappings of the secondary coil
143T coil terminal of the secondary coil
144A, 144B, 144C tuning capacitors
145A, 146 isolated drivers of the resonator channel 14A
1451A, 1461A input lines of the isolated drivers 145A, 146A
1452A, 1462A input lines of the isolated drivers 145A, 146A
1453A, 1463A light emitting diode of the isolated drivers 145A, 146A
1454A, 1464A light sensitive diodes of the isolated drivers 145A, 146A
1455A, 1465A turn-off circuitry of the isolated drivers 145A, 146A
147A control resistor
148A control loop
149A voltage supply device/low dropout regulator
2 coil system
21 transmitter coil
211, 212 terminals of the transmitter coils
22A, 22B receiver coils
3 receiver unit
31 matching unit
32 amplifier
33 phase detector
34I, 34Q analogue to digital converters
4 control unit
40 operating program
411 control signals applied to the frequency generator
414 control signals applied to the adapter module
45 signal processing unit/DSP
6 conveyor
T1, T2 MOS-FETs of the semiconductor switching devices
D1, D2 diodes of the semiconductor switching devices

The invention claimed is:

1. Metal detection apparatus comprising a balanced coil system comprising:
a transmitter coil connected with a first coil terminal and a second coil terminal to a transmitter unit; and
a first and a second receiver coil connected to an input of a receiver unit, whose output is connected to a signal processing unit,
said transmitter unit comprising a controllable frequency generator configured to provide an input signal with a selectable operating frequency to the input of an amplifier stage, whose output is connected to an adaptation unit;
said adaptation unit comprising:
a coupling transformer with at least one primary coil and at least one secondary coil having a transformer coil terminal and a plurality of transformer tappings;
a plurality of tuning capacitors having first and second capacitor terminals; and
switching devices, with which the secondary coil of the coupling transformer and at least one of the tuning capacitors is connected to the transmitter coil;
a plurality of individually selectable resonator channels, each resonator channel, when selected, comprising the transmitter coil, tapped windings of the secondary coil of the coupling transformer, one of the tuning capacitors connected to one another by a first one of the switching devices ("first semiconductor switching device") and by a second one of the switching devices ("second semiconductor switching device"), wherein the plurality of individually selectable resonator channels are controllable by a channel selector and one of the resonator channels is always selectable;
wherein the related tapped windings of the secondary coil of the coupling transformer and the related tuning capacitor are connected by the first semiconductor switching device and the related tapped windings of the secondary coil of the coupling transformer and the related tuning capacitor are connected by the second semiconductor switching device,
wherein the channel selector comprises for each one of the first semiconductor switching device and the second semiconductor switching device at least one isolated driver, including a photovoltaic driver, with which control lines are galvanically isolated from control inputs of the first semiconductor switching device and the second semiconductor switching device.

2. The metal detection apparatus of claim 1, wherein:
for each resonator channel, when selected, the related tapped windings of the secondary coil of the coupling transformer are connected by the first semiconductor switching device in series or in parallel to the transmitter coil.

3. The metal detection apparatus of claim 1, wherein:
for each resonator channel, when selected, the related tuning capacitor is connected by the second semiconductor switching device in series or in parallel to the transmitter coil.

4. The metal detection apparatus of claim 1, wherein:
for each resonator channel, when selected, the related tapped windings of the secondary coil of the coupling transformer are connected by the first semiconductor switching device and the related tuning capacitor is connected by the second semiconductor switching device each in parallel to the transmitter coil.

5. The metal detection apparatus of claim 1, wherein:
the plurality of individually selectable resonator channels are arranged in parallel.

6. The metal detection apparatus of claim 1, wherein:
the first semiconductor switching device and the second semiconductor switching device are bi-directional-MOS-FET units.

7. The metal detection apparatus of claim 6 wherein:
each bi-directional-MOS-FET unit comprises a first MOS-FET and a second MOS-FET, each having a source terminal, a drain terminal and a gate terminal, with the source terminals connected on the one hand with one another and on the other hand with identical first terminals of two diodes, which are each connected with their second terminal to the drain terminal of the first MOS-FET or the second MOS-FET, respectively.

8. The metal detection apparatus of claim 6, wherein:
the input lines of the isolated drivers assigned to the first semiconductor switching device and the second semiconductor switching device of the related selectable resonator channel, respectively, which are each connected to a light emitting diode, are connected in series and that the output lines of the isolated drivers are connected to the input terminals of the first semiconductor switching device and the second semiconductor switching device of the related selectable resonator channel, respectively.

9. The metal detection apparatus of claim 8, wherein:
the light emitting diodes of the isolated drivers are connected in series with a control resistor thus forming a control loop that is connected to the output of a constant voltage supply device.

10. The metal detection apparatus of claim 9, wherein:
the constant voltage supply device comprises a low dropout regulator.

11. The metal detection apparatus of claim 1, wherein:
at least the frequency generator and the channel selector of the transmitter are controllable by a control program implemented in a computer system which, when executed, provides for selection of operating frequencies and related resonator channels.

12. The metal detection apparatus of claim 11, wherein:
the control program is configured to, when executed within a process of measuring conveyed goods, cause the operating frequencies and the related resonator channels to be alternatingly changed or keyed between at least two settings or operating frequencies.

13. The metal detection apparatus of claim 1, wherein:
the adaptation unit comprises at least three selectable resonator channels.

14. The metal detection apparatus of claim 2, wherein:
the plurality of individually selectable resonator channels are arranged in parallel.

15. The metal detection apparatus of claim 3, wherein:
the plurality of individually selectable resonator channels are arranged in parallel.

16. The metal detection apparatus of claim 4, wherein:
the plurality of individually selectable resonator channels are arranged in parallel.

17. The metal detection apparatus of claim 7, wherein:
the input lines of the isolated drivers assigned to the first semiconductor switching device and the second semiconductor switching device of the related selectable resonator channel, respectively, which are each connected to a light emitting diode, are connected in series and that the output lines of the isolated drivers are connected to the input terminals of the first semiconductor switching device and the second semiconductor switching device of the related selectable resonator channel, respectively.

* * * * *

UNITED STATES PATENT AND TRADEMARK OFFICE
CERTIFICATE OF CORRECTION

Page 1 of 1

PATENT NO. : 12,510,684 B2
APPLICATION NO. : 18/273403
DATED : December 30, 2025
INVENTOR(S) : David Lyon It is certified that error appears in the above-identified patent and that said Letters Patent is hereby corrected as shown below:

On the Title Page

In Item (57), Abstract, Line 2, please delete "unit," and insert -- unit --.

In the Specification

In Column 2, Line 51, please delete "U.S. Ser. No. 10/184,908B2" and insert -- US10184908B2 --.

In Column 4, Line 61, please delete "10 A" and insert -- 10A --.

In Column 6, Line 12, "and FIG. 2 shows a part of the" should be on a new line.

In Column 9, Line 41, please delete "10 A" and insert -- 10A --.

Signed and Sealed this
Tenth Day of February, 2026

John A. Squires
*Director of the United States Patent and Trademark Office*